Feb. 14, 1950 A. R. HITE 2,497,170
TOOL
Filed Oct. 30, 1945 2 Sheets-Sheet 1

Inventor
Alonzo R. Hite,
By McMorrow, Berman & Davidson
Attorneys

Patented Feb. 14, 1950

2,497,170

UNITED STATES PATENT OFFICE 2,497,170

TOOL

Alonzo R. Hite, Mattoon, Ill.

Application October 30, 1945, Serial No. 625,473

1 Claim. (Cl. 90—11)

My invention relates to tools and particularly to a milling attachment adapted to be connected with lathes and the like.

The main object of the invention is to make it possible to execute small milling operations in small shops not being equipped with a conventional milling machine.

Another object of the invention is to provide a milling device adapted to be easily attachable to and removable from a lathe or the like.

A further object of the operation is to provide a milling device adapted to be used in connection with a lathe or the like, which can be handled as one unit for the purpose of attaching it to or removing it from the lathe.

Other objects of the invention may appear in the following specification describing my invention with reference to the accompanying drawings forming a part thereof. It is however to be noted that my invention is not to be limited or restricted to the exact construction and combination described in the following specification and shown in the drawings, but that such changes and modifications can be made, which fall within the scope of the claim appended hereto.

Figure 1:
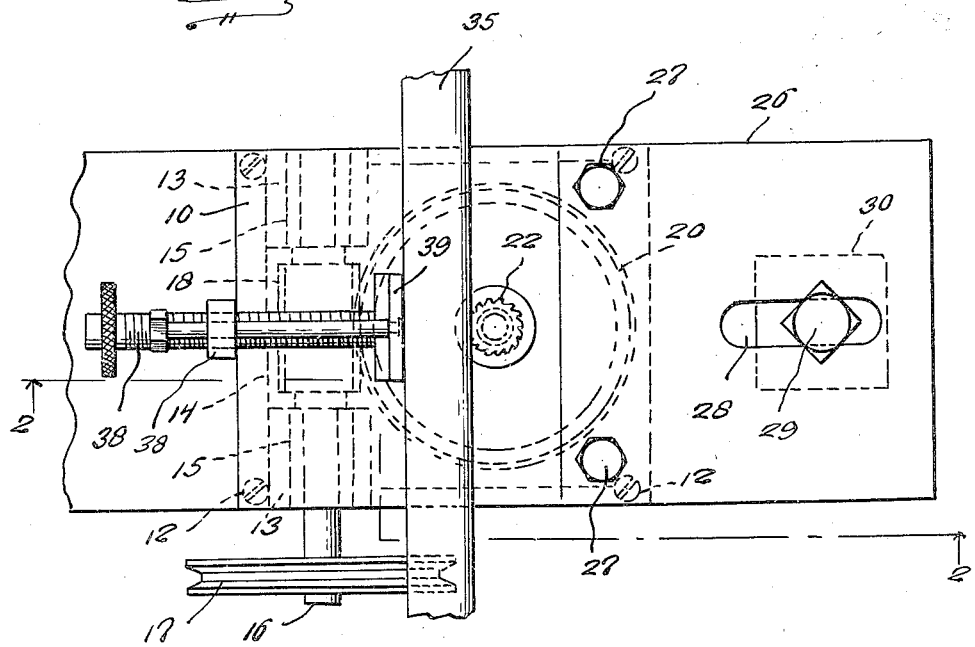
Figure 1 is a top view of the milling attachment according to my invention showing a shaft to be worked on in position, but omitting the motor driving the milling cutter.
Figure 2:
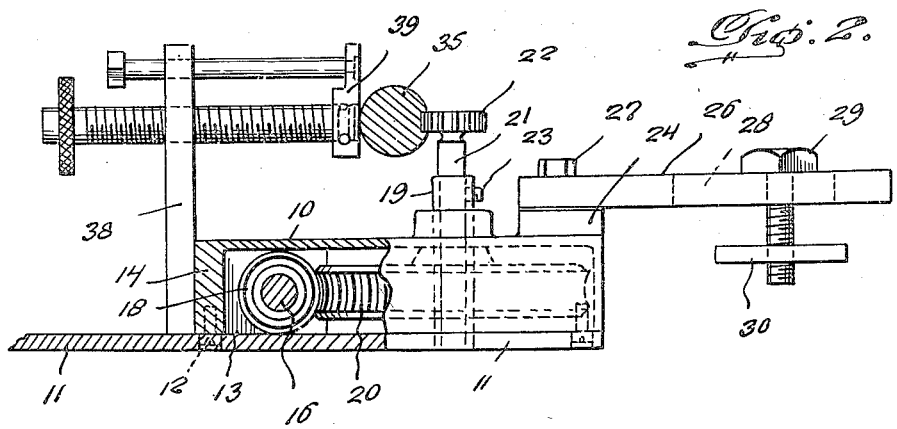
Figure 2 is a sectional view substantially taken on line 2—2 of Figure 1, a portion of the front wall of the body of the milling attachment being broken away.
Figure 3:
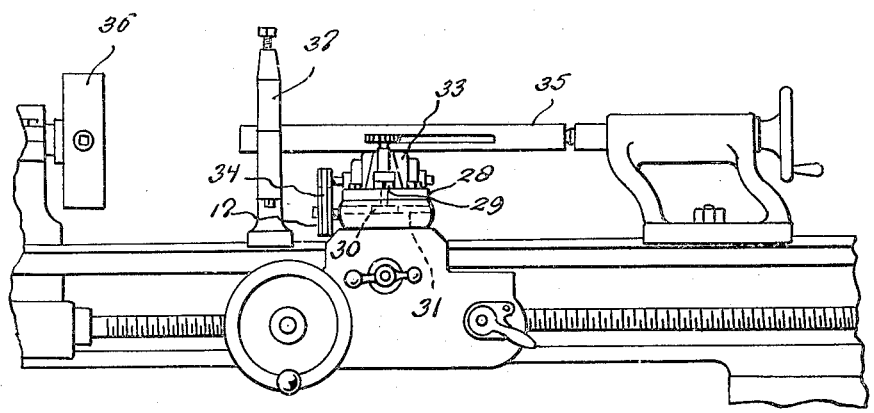
Figure 3 is a diagrammatical side view of a lathe showing the milling attachment including motor in working position.
Figure 4:
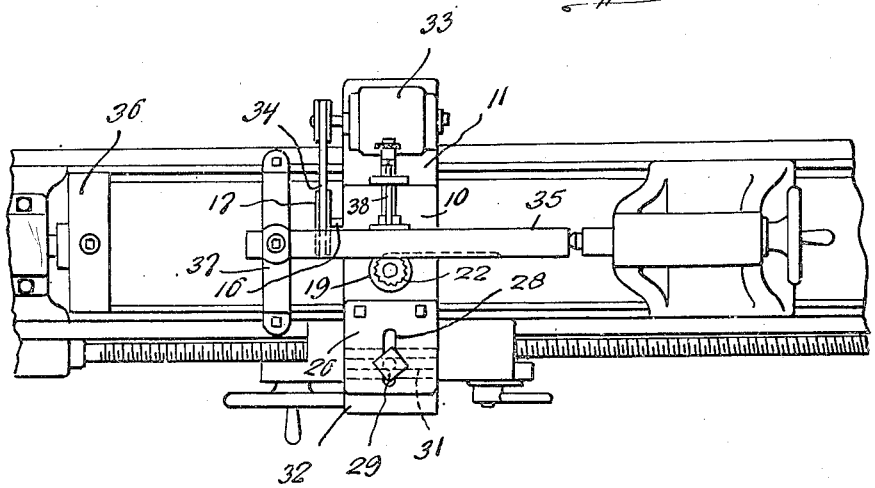
Figure 4 is a diagrammatical top view of the lathe bed, showing the milling attachment in working position and illustrating the manner in which the shaft is supported, into which a key-way is to be cut.

Referring to the drawings, the milling attachment of my invention has a box-shaped body 10 open at the bottom and provided with a plate 11 attached to said body by means of bolts 12. Two bushing blocks 13 are arranged as integral parts of the body 10 adjacent the side wall 14 of the body, which is parallel to the center line of the lathe. Centrally of said bushing blocks 13 and co-axially with each other two bushings 15 are located rotatably supporting a shaft 16. This shaft extends forwardly beyond the bushing 15 and a pulley 17 is rigidly mounted centrally thereon. Between the two bushings 15 a worm 18 is fast on the shaft 16. A hollow shaft 19 extends vertically through the top of the body 10 and the bottom plate 11 thereof and is rotatable therein. A worm wheel 20 is rigidly mounted on this hollow shaft and meshes with the worm 18. The stem 21 of a milling cutter 22 may be inserted into the hollow shaft 19 and is rigidly held therein by a set screw 23. A rectangular spacer bar 24 extends cross-wise over the whole width of the body adjacent its end which is also parallel to the center line of the lathe. A supporting plate 26 is fastened on top of the spacer bar 24 by means of bolts 27, which extend through the plate and the bar and are screwed into the body 10 to hold the bar 24 and the plate 26 in place. A slot 28 is provided in the plate 26, extends lengthwise thereof and is located symmetrically on the longitudinal center line of the milling device. A bolt 29 is slidably inserted in said slot and carries on its lower portion underneath the supporting bar 26 a clamping plate 30. This clamping plate is adapted to slide into the T-slot 31 of the tool carrier 32 of the lathe. The bottom plate 11 is extended beyond the above mentioned body wall 14 and extends transversely of the lathe, as shown in Figures 3 and 4. On this extension of plate 11 a motor 33 is mounted which drives the pulley 17 by means of a belt 34. In this manner the milling cutter 22 is also driven.

To adjust and hold a shaft 35 in position for cutting a key-way therein, said shaft is first lined up by using a self-centering chuck 36 in the head stock and the center of the tail-stock. Then support the shaft in a steady rest 37 of conventional construction and back the shaft off from the chuck 36. In order to prevent the shaft from vibrating while the key-way is being cut, an adjustable steady block 38 of conventional construction is fastened to the body 10 and adjusted so that the face plate 39 will support the shaft 35 against the pressure exerted by the cutter 22.

From the above description it will be understood that the milling attachment can be handled as one unit and can be easily attached to and detached from a lathe or the like. The length of the key-way is limited by the distance between the steady rest and the tail stock of the lathe and the depth of the key-way can be adjusted by the feed of the tool rest of the lathe.

Having described my invention, what I claim and desire to secure by Letters Patent, is:

A keyway cutting attachment for lathes, comprising a flat horizontal support plate detachably mounted upon the tool rest of the lathe, a substantially flat low horizontal casing secured to the bottom of the support plate and extending transversely of the bed of the lathe, the casing overhanging the bed and having its bottom disposed close to the bed, an upstanding vertical shaft journaled within the casing and projecting above the top of the casing and support plate, a milling cutter secured to the vertical shaft near its top and disposed above the support plate, a worm gear secured to the vertical shaft and disposed within the casing, a horizontal worm mounted within the casing and meshing with the worm gear and having its axis extending longitudinally of the bed, a shaft carrying the worm and extending exteriorly of the casing at one side thereof, a motor secured to the casing at its end remote from the tool rest and having its armature shaft disposed horizontally and parallel to the bed of the lathe, gearing operatively connecting the armature shaft of the motor and the shaft carrying the worm, and an upstanding steady device secured to the casing and extending above the same and adapted to engage the work at its side opposite the milling cutter to prevent vibration of the work.

ALONZO R. HITE.

REFERENCES CITED

The following references are of record in the file of this patent:

UNITED STATES PATENTS

| Number | Name | Date |
| --- | --- | --- |
| 782,238 | Hanson | Feb. 14, 1905 |
| 1,038,571 | Haase | Sept. 17, 1912 |
| 1,488,806 | Church | Apr. 1, 1924 |
| 2,074,844 | Hill | Mar. 23, 1937 |
| 2,188,447 | Smith | Jan. 30, 1940 |